(12) United States Patent
Sakata et al.

(10) Patent No.: US 12,391,138 B2
(45) Date of Patent: Aug. 19, 2025

(54) ELECTRIC VEHICLE, AND CHARGING AND DISCHARGING FACILITY, AND SYSTEM

(71) Applicant: Prime Planet Energy & Solutions, Inc., Tokyo (JP)

(72) Inventors: Hideki Sakata, Nishinomiya (JP); Jun Asakura, Kakogawa (JP); Yutaka Yamauchi, Himeji (JP); Hideyuki Nagai, Nagoya (JP); Masanori Iechika, Toyota (JP); Yasuhiko Ikeda, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 6 days.

(21) Appl. No.: 17/929,755

(22) Filed: Sep. 6, 2022

(65) Prior Publication Data

US 2023/0070376 A1 Mar. 9, 2023

(30) Foreign Application Priority Data

Sep. 8, 2021 (JP) ................................ 2021-146113

(51) Int. Cl.
| | |
|---|---|
| *G06Q 30/0283* | (2023.01) |
| *B60L 53/62* | (2019.01) |
| *B60L 53/68* | (2019.01) |
| *G06Q 50/06* | (2024.01) |

(52) U.S. Cl.
CPC .............. *B60L 53/62* (2019.02); *B60L 53/68* (2019.02); *G06Q 30/0283* (2013.01); *G06Q 50/06* (2013.01)

(58) Field of Classification Search
CPC .......... B60L 53/62; B60L 53/68; B60L 53/64; B60L 53/66; B60L 53/67; B60L 55/00; G06Q 30/0283; Y02T 90/12; Y02T 90/167

USPC ......................................................... 705/412
See application file for complete search history.

(56) References Cited

U.S. PATENT DOCUMENTS

| | | | | |
|---|---|---|---|---|
| 2009/0313104 | A1* | 12/2009 | Hafner .................. | G06Q 20/10 705/14.25 |
| 2012/0249068 | A1 | 10/2012 | Ishida | |
| 2013/0274972 | A1* | 10/2013 | Kusumi .............. | B60W 50/085 701/22 |
| 2015/0120109 | A1 | 4/2015 | Cun | |

(Continued)

FOREIGN PATENT DOCUMENTS

| | | |
|---|---|---|
| JP | 2012-178909 A | 9/2012 |
| JP | 5529894 B2 | 6/2014 |

(Continued)

OTHER PUBLICATIONS

Muhammad Aziz; Bentang Arief Budiman; "Extended Utilization of Electric Vehicles in Electrical Grid Services"; 2017 4th International Conference on Electric Vehicular (ICEVT); Oct. 2-5, 2017 (Year: 2017).*

*Primary Examiner* — Dione N. Simpson
(74) *Attorney, Agent, or Firm* — HAUPTMAN HAM, LLP

(57) ABSTRACT

A new system is provided that enables a resource aggregator to smoothly use on-board batteries of electric vehicles as an energy resource. A user is allowed to select whether or not to permit interchange of electric power between a charging and discharging facility and an electric vehicle through the resource aggregator when the electric vehicle is connected to the charging and discharging facility.

7 Claims, 3 Drawing Sheets

(56) References Cited

U.S. PATENT DOCUMENTS

| | | | |
|---|---|---|---|
| 2019/0143825 A1* | 5/2019 | Ichikawa | B60L 53/16 |
| | | | 320/109 |
| 2020/0006954 A1* | 1/2020 | Miyata | H02J 13/00026 |
| 2020/0091752 A1 | 3/2020 | Esaka et al. | |
| 2020/0101861 A1* | 4/2020 | Ichikawa | B60L 53/62 |
| 2020/0384883 A1* | 12/2020 | Amari | B60L 58/12 |
| 2021/0129689 A1 | 5/2021 | Nakamura et al. | |
| 2021/0170903 A1 | 6/2021 | Tsuchiya et al. | |
| 2021/0252993 A1 | 8/2021 | Kinomura et al. | |
| 2021/0331600 A1 | 10/2021 | Hishida et al. | |
| 2021/0380014 A1 | 12/2021 | Hishida et al. | |
| 2022/0122163 A1* | 4/2022 | Obata | G06Q 30/08 |
| 2022/0239106 A1* | 7/2022 | Kubota | B60L 53/51 |
| 2022/0250498 A1* | 8/2022 | Okada | B60L 53/18 |
| 2022/0261836 A1* | 8/2022 | Kinomura | G06Q 50/40 |
| 2023/0046454 A1* | 2/2023 | Holmes | B60L 53/62 |

FOREIGN PATENT DOCUMENTS

| | | | |
|---|---|---|---|
| JP | 2015-089337 | A | 5/2015 |
| JP | 2018-147029 | A | 9/2018 |
| JP | 2019-092279 | A | 6/2019 |
| JP | 202042686 | A | 3/2020 |
| JP | 2020-102142 | A | 7/2020 |
| JP | 6783196 | B2 | 11/2020 |
| JP | 2021-072682 | A | 5/2021 |
| JP | 2021-093802 | A | 6/2021 |
| JP | 2021-129441 | A | 9/2021 |
| WO | 2011077780 | A1 | 6/2011 |
| WO | 2020148849 | A1 | 7/2020 |
| WO | 2020148856 | A1 | 7/2020 |

* cited by examiner

ELECTRIC VEHICLE, AND CHARGING AND DISCHARGING FACILITY, AND SYSTEM

CROSS REFERENCE TO RELATED APPLICATIONS

The present application claims priority from Japanese Patent Application No. 2021-146113 filed on Sep. 8, 2021, which is incorporated by reference herein in its entirety.

BACKGROUND

The present invention relates to electric vehicles, and charging and discharging facilities, and systems.

International Publication No. 2011/077780 discloses an electric power grid control system. The electric power grid control system includes a power aggregator that ranks the degrees of need of charging and discharging the storage batteries of electric vehicles and creates a ranking list that shows the ranks. The power aggregator distributes information for guiding the electric vehicles so as to charge or discharge at designated charging and discharging stations according to the ranking list. It is stated that this enables guiding the electric vehicles in motion to charging and discharging stations and thereby allows the power grid side to retain sufficient electric power for charging and discharging more reliably.

SUMMARY

The present inventors are investigating to develop a system for adjusting electric power supply and demand by utilizing on-board batteries of electric vehicles connected to a power utility grid via charging stations, in response to an instruction for interchanging of electric power from a power utility company. the system being made available to resource aggregators. In the course of the investigation, the present inventors believe that resource aggregators need a new system that enables on-board batteries of electric vehicles to be used as an energy resource smoothly.

An electric vehicle according to the present disclosure includes a selection process unit configured to select whether or not to permit the electric vehicle, when connected to the charging and discharging facility, to interchange electric power with a charging and discharging facility through a resource aggregator. The just-described electric vehicle makes it possible to select, when connected to the charging and discharging facility, whether or not to permit interchange of electric power with the charging and discharging facility through the resource aggregator, so that the resource aggregator can smoothly use the electric vehicle connected to the charging and discharging facility as an energy resource.

The electric vehicle may include a condition setting unit configured to set conditions for interchanging electric power. The condition setting unit may be configured to set at least a lower limit value of an electricity sales price that is applied when electric power is discharged from the electric vehicle through the resource aggregator. The condition setting unit may also be configured to set at least an upper limit value of the electricity purchase price that is applied when electric power is charged to the electric vehicle through the resource aggregator. The condition setting unit may also be configured to be able to set a required amount of charge.

A charging and discharging facility according to the present disclosure includes a selection process unit configured to select whether or not to permit the charging and discharging facility, when an electric vehicle is connected thereto, to interchange electric power with the electric vehicle through a resource aggregator. The just-described charging and discharging facility makes it possible to select, when the electric vehicle is connected to the charging and discharging facility, whether or not to permit interchange of electric power between the electric vehicle and the charging and discharging facility through the resource aggregator, so that the resource aggregator can smoothly use the electric vehicle connected to the charging and discharging facility as an energy resource.

The charging and discharging facility may include a condition setting unit that sets conditions for interchanging electric power. The condition setting unit may be configured to set at least a lower limit value of an electricity sales price that is applied when electric power is discharged from the electric vehicle through the resource aggregator. The condition setting unit may also be configured to set at least an upper limit value of the electricity purchase price that is applied when electric power is charged to the electric vehicle through the resource aggregator. The condition setting unit may be configured to be able to set a required amount of charge for the electric vehicle.

A program according to the present disclosure may be configured to cause a control terminal of a user to serve functions of selecting whether or not to permit interchange of electric power between an electric vehicle and a charging and discharging facility through a resource aggregator when the electric vehicle is connected to the charging and discharging facility, and transmitting a result of the selection to a predetermined server. The just-described program is able to cause the control terminal of the user to function so as to select whether or not to permit interchange of electric power between the electric vehicle and the charging and discharging facility through the resource aggregator when the electric vehicle is connected to the charging and discharging facility. This enables the resource aggregator to smoothly use the electric vehicle connected to the charging and discharging facility as an energy resource.

The program may cause the control terminal of the user to function so as to show a display screen for selecting whether or not to permit interchange of electric power between the electric vehicle and the charging and discharging facility through the resource aggregator when the electric vehicle is connected to the charging and discharging facility. In addition, the program may cause the control terminal of the user to function so as to set conditions for permitting interchange of electric power between the electric vehicle and the charging and discharging facility through the resource aggregator. In addition, the program may cause the control terminal of the user to function so as to show a display screen for setting conditions for permitting interchange of electric power between the electric vehicle and the charging and discharging facility through the resource aggregator.

The program may cause the control terminal of the user to function so as to store conditions for permitting interchange of electric power between the electric vehicle and the charging and discharging facility through the resource aggregator. The program may be configured to cause the control terminal of the user to function so as to store a compensation obtained by a sale of electricity from the electric vehicle or the user. The program may be configured to cause the control terminal of the user to function so as to use the compensation obtained by the sale of electricity from the electric vehicle or the user for a purchase of electricity by the electric vehicle or the user. The program may be configured to cause the control terminal of the user to function so as to exchange the compensation obtained by the sale of electricity from the electric vehicle or the user with points that are commercially usable by the electric vehicle or the user.

The control terminal of the user may be a mobile communication terminal of the user. It is also possible that the control terminal of the user may be incorporated in the electric vehicle. It is also possible that the control terminal of the user may be incorporated in the charging and discharging facility.

A charging and discharging management system according to the present disclosure includes a server connected to a communication network. The server includes: a memory storage unit storing data representing electric vehicles and data representing users respectively in association with each other; a detection unit detecting, through the communication network, that at least one of the electric vehicles has been connected to a charging and discharging facility managed by a resource aggregator; and a controller configured to start interchange of electric power through the resource aggregator between the charging and discharging facility and the at least one of the electric vehicles detected to have been connected to the charging and discharging facility, based on permission information acquired from a control terminal operated by one of the users through the communication network. The just-described charging and discharging management system is able to select whether or not to permit interchange of electric power between the electric vehicle and the charging and discharging facility through the resource aggregator when the electric vehicle is connected to the charging and discharging facility. This enables the resource aggregator to smoothly use the electric vehicle connected to the charging and discharging facility as an energy resource.

The server may further include a notification unit notifying the control terminal of the user associated with an electric vehicle connected to the charging and discharging facility that the electric vehicle has been connected to the charging and discharging facility. The server may be configured to start, after the notification from the notification unit, interchange of electric power between the charging and discharging facility and the electric vehicle through the resource aggregator, based on the permission information acquired from the control terminal of the user.

In addition, the server may further include a condition storing unit storing conditions for interchanging electric power in association with at least one of the electric vehicles or at least one of the users. It is also possible that the server may be configured to store the compensation obtained by the sales of electricity from the electric vehicle or the user. It is also possible that the server may be configured to use the compensation obtained by the sales of electricity from the electric vehicle or the user for a purchase of electricity by the user. It is also possible that the server may be configured to exchange the compensation obtained by the sales of electricity from the electric vehicle or the user with points that are commercially usable by the user.

The server may be configured to provide any of the above-described programs through a communication network.

DETAILED DESCRIPTION

Embodiments of the present disclosure will be described hereinbelow. It should be noted, however, that the embodiments illustrated herein are, of course, not intended to limit the disclosure. The drawings are depicted schematically and do not necessarily accurately depict actual objects. The features and components that exhibit the same effects are designated by the same reference symbols as appropriate, and the description thereof will not be repeated.

Charging and Discharging Management System 10

Figure 1:
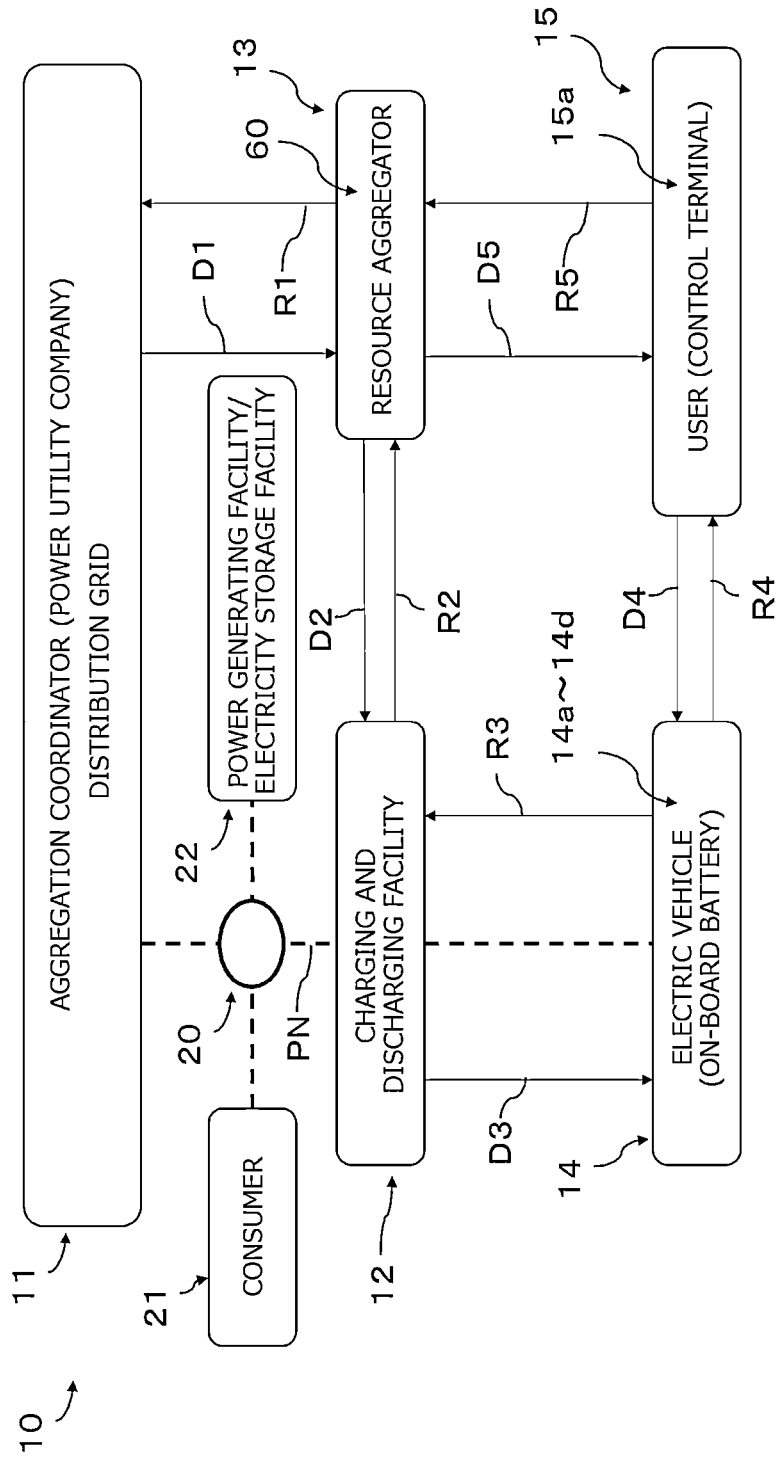
FIG. 1 is a schematic view schematically illustrating a charging and discharging management system 10.
Figure 2:
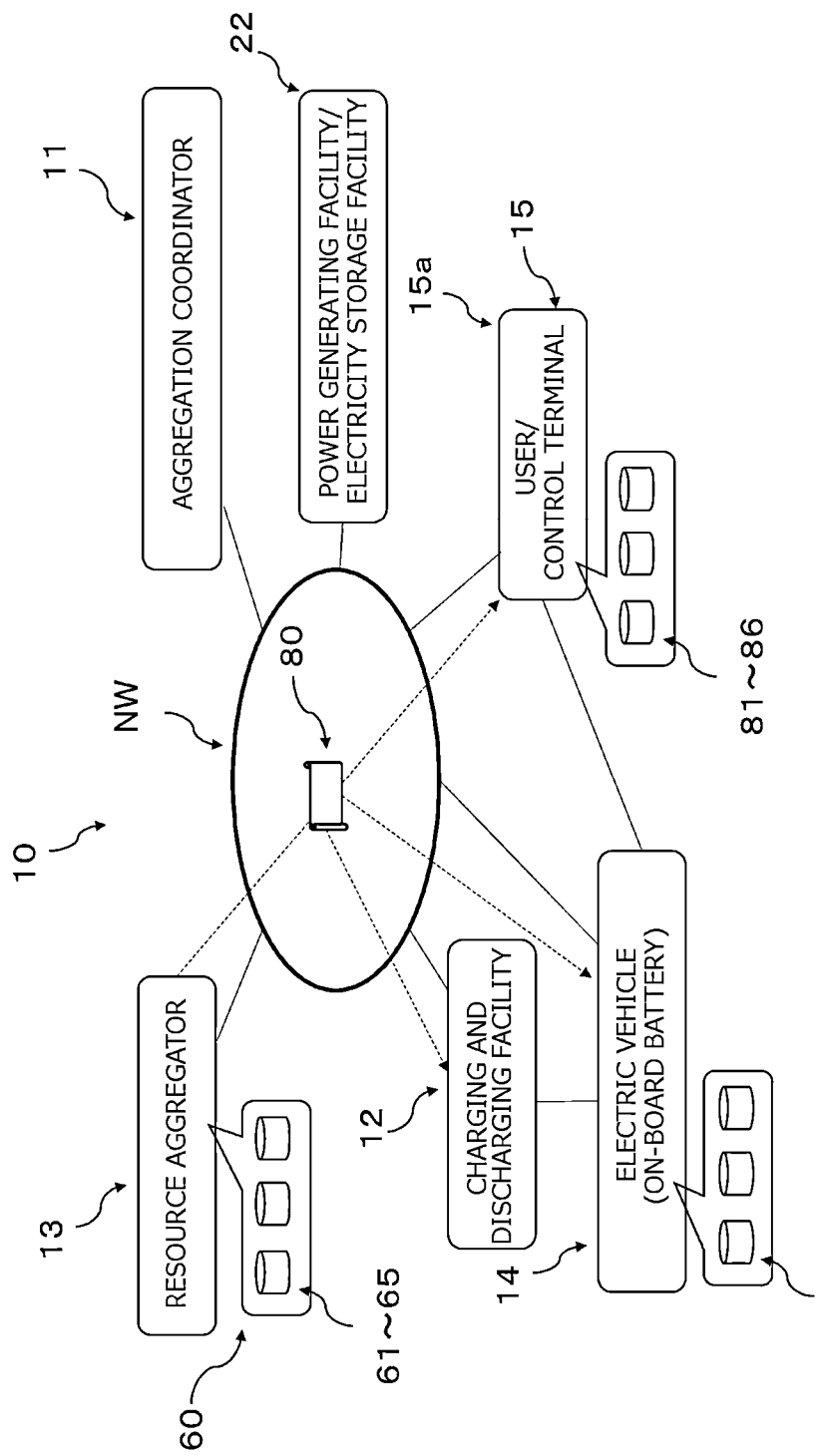
FIG. 2 is another schematic view schematically illustrating the charging and discharging management system 10.

FIGS. 1 and 2 are schematic views schematically illustrating a charging and discharging management system 10.

The charging and discharging management system 10 involves, as illustrated in FIG. 1, an aggregation coordinator 11, a charging and discharging facility 12, a resource aggregator 13, an electric vehicle 14, and a user 15 of the electric vehicle 14.

FIG. 1 illustrates the relationship, centered around a distribution grid provided by the aggregation coordinator 11, between the aggregation coordinator 11, the charging and discharging facility 12, the resource aggregator 13, the electric vehicle 14, and the user 15, which are in the charging and discharging management system 10. The dashed lines PN in FIG. 1 represent power lines.

FIG. 2 illustrates the relationship between the aggregation coordinator 11, the charging and discharging facility 12, the resource aggregator 13, the electric vehicle 14, and the user 15 through a communication network NW. Herein, the user 15 may be an individual human user. However, in cases where processes implemented by a computer are illustrated, the term "user 15" may be used to mean a control terminal operated by the user, such as a smartphone. Likewise, the aggregation coordinator 11 and the resource aggregator 13 may represent management servers managed by the aggregation coordinator 11 and the resource aggregator 13 respectively for the processes implemented by a computer. The charging and discharging facility 12 may be configured to be able to perform communication by means of power line communication. The electric vehicle 14 may also be configured to be capable of communication via the charging and discharging facility 12, by being connected to the charging and discharging facility 12. The electric vehicle 14 may be configured to be able to perform communication through a control terminal 15a operated by the user 15. The electric vehicle 14 may be directly connected to the communication network NW by other means of communication. The control terminal 15a operated by the user 15 may be an information terminal such as a smartphone, for example. The control terminal 15a operated by the user 15 may be provided in the electric vehicle 14, and it may also be one that is operated on, for example, a control screen panel provided in the electric vehicle 14. The control terminal 15a operated by the user 15 may be provided in the charging and discharging facility 12, and it may also be one that is operated on, for example, a control screen panel provided in the charging and discharging facility 12.

The charging and discharging management system 10 is, as illustrated in FIG. 1, a system that is applied to what is called a virtual power plant (VPP) service 20 that utilizes electric vehicles 14. Here, the term "virtual power plant (VPP)" generally means that consumers 21, owners of power generating facilities and electricity storage facilities 22 directly connected to the power utility grid, and third parties perform controlling of their energy resources to provide the function equivalent to a power generation plant.

The controlling of the energy resources may include a reverse power flow from the energy resources on the consumer 21 side to the power utility grid. The power generating facilities 22 connected to the virtual power plant (VPP) service may include various types of power generating facilities, such as regional solar power generation, wind power generation, small-sized hydroelectric power generation, and fuel cells. The electricity storage facilities may include storage batteries installed in households, factories, commercial facilities, and the like. The reverse power flow may include reversing excess electric power to the power utility grid side in cases where, for example, the electric power stored in the above-mentioned electricity storage facilities 22 is abundant.

Herein, the power utility grid is a system that integrates power generation, electrical substations, power transmission, and power distribution together, for supplying electric power to consumers' power receiving facilities. The power utility grid may include, for example, a transmission grid from power generation plants, and a distribution grid that supplies electric power from the transmission grid to end consumers.

The distribution grid may be provided with a large number of distributed power supplies, such as solar power generation, wind power generation, small-sized hydroelectric power generation, storage batteries including electric vehicles, fuel cells, and cogeneration. The operation status of these distributed power supplies is monitored through, for example, online digital data communication, so that a control system can be constructed that is able to smoothly supply electric power corresponding to the consumption in the grid. Power utility grids that contain such distributed power supplies may be considered as independent small-sized grids (microgrids) each of which has the function similar to a large-scale transmission and distribution grid operated by an electric power enterprise. Such small-sized power distribution grids are called microgrids.

The aggregation coordinator 11 is a business operator that aggregates the amount of electric power controlled by the resource aggregator 13 and engages in electric power transactions with general transmission-and-distribution operators and retail electric providers. The aggregation coordinator 11 is served by, for example, a power utility company.

Consumers 21 refer to those who receive and use electricity. The energy resources on the consumer 21 side include solar power generation, storage batteries including electric vehicles, fuel cells, cogeneration, and the like.

The technique in which demand patterns of electric power are changed by owners of the consumer-side energy resources or third parties by controlling their energy resources is called demand response (DR). According to the patterns of demand control, the demand response is classified into two types, "downward DR" in which demand is reduced (i.e., suppressed) and "upward DR" in which demand is increased (i.e., created).

The charging and discharging facility 12 is connected to the power utility grid. The electric vehicle 14 is connected to the charging and discharging facility 12 so that the charging and discharging facility 12 can perform charging from the power utility grid to the electric vehicle 14 and discharging from the electric vehicle 14 to the power utility grid. The charging and discharging facility 12 may be, for example, a charging station for electric vehicles 14. The charging and discharging facility 12 may be installed in, for example, residential houses, commercial facilities, and factories, so as to connect an electric vehicle 14 connected thereto to the power utility grid. In this embodiment, the charging and discharging facility 12 may be controlled by the resource aggregator 13. The electric vehicle 14 includes an on-board battery. The on-board battery has a required capacity for supplying electric power as a driving power source to the electric vehicle 14. The electric vehicles 14 may include a wide range of vehicles that store electric power in on-board batteries to drive the vehicles, such as pure electric vehicles, hybrid electric vehicles including plug-in hybrid vehicles, and fuel cell vehicles.

The resource aggregator 13 is generally a business operator that directly makes VPP service agreements with consumers of electric power to control the resources. In this embodiment, the resource aggregator 13 utilizes the electric vehicles 14 as an energy resource to contribute to demand response (DR). To use the electric vehicle 14 as an energy resource, the resource aggregator 13 stores electric power in the electric vehicle 14 when there is a surplus of electric power in the power utility grid, while it transmits the electric power stored in the electric vehicle 14 to the power utility grid when there is a shortfall of electric power in the power utility grid. This makes it possible to adjust the electric power demand in the microgrid to which the electric vehicle 14 is connected.

As illustrated in FIG. 1, the aggregation coordinator 11 requests the resource aggregator 13 to perform control for adjusting demand according to demand response (D1). The resource aggregator 13 responds to such a control request according to the agreement with the aggregation coordinator 11 (R1). The adjustments that are required of the resource aggregator 13 are two types, "downward DR" in which electric power demand is reduced (i.e., suppressed) and "upward DR" in which electric power demand is increased (i.e., created).

The present inventors intend to provide a system that enables the resource aggregator 13 to utilize the charging and discharging facilities 12 in the city, to allow even the users 15 of the electric vehicles 14 that have not signed up for the service in advance to make use of the electric vehicles 14 as energy resources as appropriate. For example, it is possible to construct a system in which the user 15 is able to allow the resource aggregator 13 to use his/her electric vehicle 14 to use as an energy resource when the user 15 connects the electric vehicle 14 to a charging and discharging facility 12 not only at a nearby destination but also at a distant destination to which the user 15 travels by the electric vehicle 14, such as a travel destination or a business trip destination. When such a system is accomplished, it is possible to use the electric vehicle 14 as an energy resource when the electric vehicle 14 is connected to a charging and discharging facility 12 in the city that is provided by the resource aggregator 13.

For example, the resource aggregator 13 may respond to the request for "downward DR" with discharging from the electric vehicle 14 through the charging and discharging facility 12. On the other hand, the resource aggregator 13 may respond to the request for "upward DR" with charging to the electric vehicle 14 through the charging and discharging facility 12 (see D2, D3, R2, and R3 in FIG. 1). The resource aggregator 13 is able to respond to the request for demand response adjustment from the aggregation coordinator 11 by controlling charging and discharging of the electric vehicle 14 through the charging and discharging facility 12.

This enables the resource aggregator 13 to obtain the opportunity to widely use the electric vehicles 14 in the city as the energy resources, making it possible to obtain a greater energy resource. Because a larger number of electric vehicles 14 can be used as the energy resources, the resource aggregator 13 is allowed to more easily respond to the request for demand response (DR) from the aggregation coordinator 11 and to have more freedom in responding to greater fluctuations in electric power demand. As a result, the operation of the resource aggregator 13 becomes more stable.

In addition, profit is distributed to the users 15 of the electric vehicles 14 according to the amount by which the resource aggregator 13 uses the electric vehicles 14 as the energy resource. Thus, the profits earned by the resource aggregator 13 are distributed to the users 15 of the electric vehicles 14. This brings a win-win relationship to both the resource aggregator 13 and the users 15 of the electric vehicles 14. Furthermore, it is possible to achieve a system that is also significant for the community in which electric power is supplied through the aggregation coordinator 11 or microgrids, in the aspect of more stable supply of electric power.

In the course of achieving such a system, the present inventors intend to make participation in the service more easy and lower the barriers to the participation so that even the users 15 of the electric vehicles 14 who have not signed up for the service in advance can allow their electric vehicles 14 to participate as an energy resource of the resource aggregator 13 easily.

Electric Vehicle 14

As illustrated in FIGS. 1 and 2, the electric vehicle 14 in this embodiment includes a detection unit 14a, a selection process unit 14b, a condition setting unit 14c, and a recording unit 14d. The detection unit 14a, the selection process unit 14b, the condition setting unit 14c, and the recording unit 14d are each implemented as one of the functions of a computer incorporated in the electric vehicle 14 as respective cooperative processes of the computer with the software incorporated in the computer.

Herein, the electric vehicle 14 includes a computer, such as an electronic control unit (ECU). The computer incorporated in the electric vehicle 14 performs required functions according to, for example, a predetermined program. Various functions of the computer may be processed by cooperation of software with an arithmetic unit [also referred to as a processor, CPU (central processing unit), or MPU (micro-processing unit)] and a memory storage device (such as a memory and a hard disk) of the computer. By such an electronic control unit, the electric vehicle 14 may also function as a control terminal operated by the user 15. For example, it is possible to use a display panel for showing map information or the like as a control screen panel operated by the user 15. The software may be, for example, provided from the resource aggregator 13 through a communication network NW, or may be configured to be able to be updated as appropriate. The software may be provided to the electric vehicle 14 through the charging and discharging facility 12. Various processes of the electric vehicle 14 may be implemented by cooperative processes with the charging and discharging facility 12.

The detection unit 14a may be configured to detect that the electric vehicle 14 has been connected to the charging and discharging facility 12 managed by the resource aggregator 13. In this embodiment, the detection unit 14a may be configured to be able to detect that the electric vehicle 14 has been connected to the charging and discharging facility 12 based on, for example, a connection signal through a power line.

The selection process unit 14b may be configured to select whether or not to permit interchange of electric power between the electric vehicle 14 and the charging and discharging facility 12 through the resource aggregator 13 when the electric vehicle 14 is connected to the charging and discharging facility 12. The selection process unit 14b may be configured to cause a display or the like mounted in the electric vehicle 14 to show a control screen panel for selecting whether or not to permit interchange of electric power between the electric vehicle 14 and the charging and discharging facility 12 through the resource aggregator 13.

The electric vehicle 14 may be connected to the control terminal 15a of the user 15 through a communication means. When this is the case, the selection process unit 14b may be configured to cause the control terminal 15a of the user 15 to display a selection screen through software embedded in the control terminal 15a of the user 15. In this case, the electric vehicle 14 may be configured to execute a process of participating in the service as an energy resource of the resource aggregator 13 through the charging and discharging facility 12, upon receiving a permission signal D5 from the control terminal 15a of the user 15. The electric vehicle 14 may also be configured to notify the control terminal 15a of the user 15 that the process of participating in the service as an energy resource of the resource aggregator 13 has been executed.

Thus, this charging and discharging management system 10 obtains permission from the user 15 and makes use of the electric vehicle 14 as an energy resource when the vehicle 14 is connected to the charging and discharging facility 12 that is provided in the city by the resource aggregator 13. As a result, it is possible to make use of the electric vehicles 14 owned by the users 15 of the electric vehicles 14 that have not signed up for the service in advance as energy resources. The user 15 gives permission to the resource aggregator 13 to use the electric vehicle 14 as an energy resource (R5). In response to this, the resource aggregator 13 may distribute a profit earned from the use of the electric vehicle 14 as an energy resource to the user 15 (D5).

The condition setting unit 14c is a processing unit that sets conditions for interchanging electric power. The condition setting unit 14c sets conditions for which the electric vehicle 14 interchanges electric power with the charging and discharging facility 12. This enables the user 15 to set conditions under which the electric vehicle 14 is permitted to participate in the demand response service as an energy resource of the resource aggregator 13. In this case as well, the condition setting unit 14c may be configured to be able to set conditions through the control screen panel of the electric vehicle 14 or through the control terminal 15a of the user 15.

The condition setting unit 14c may set at least a lower limit value of the electricity sales price (electricity purchase price for the resource aggregator 13) that is applied when electric power is discharged from the electric vehicle 14 through the resource aggregator 13. Setting the lower limit value of the electricity sales price applied when electric power is discharged from the electric vehicle 14 through the resource aggregator 13 allows the user 15 to permit the electric vehicle 14 to participate as an energy resource of the resource aggregator 13, and to sell electric power from the electric vehicle 14 when the electricity sales price is higher than a certain level. Also, the user 15 is allowed to prohibit the electric vehicle 14 from participating as an energy resource of the resource aggregator 13 and to limit the sales of electricity by the electric vehicle 14 when the electricity sales price is low. As a result, the user 15 is able to sell electricity from the electric vehicle 14 only when the price of electric power is high.

On the other hand, the resource aggregator 13 may control the price of electricity so as to raise the electricity purchase price (the electricity sales price for the electric vehicle 14) when the request for "downward DR" for reducing demand becomes higher in the demand response. In the case where at least the lower limit value of the electricity sales price applied when electric power is discharged from the electric vehicle 14 through the resource aggregator 13 is set in the condition setting unit 14c, raising the electricity purchase price by the resource aggregator 13 results in an increase in the number of electric vehicles 14 participating in the demand response service as the energy resources. This enables the resource aggregator 13 to attract more electric vehicles 14 to participate as the energy resources, to respond to the request for "downward DR" with discharging from the electric vehicles 14, and to more easily deal with the demand response.

It is also possible that the condition setting unit 14c may set a required amount of charge at which the user 15 wishes to store in the electric vehicle 14, irrespective of the upper limit of the electricity sales price that is set herein. For example, when the user 15 wishes to keep at least about 60% state of charge of the full charge level for the electric vehicle 14, the required amount of charge may be set to 60% of the full charge level (i.e., 60% SOC). In this case, the electric vehicle 14 is not permitted to participate as an energy resource of the resource aggregator 13, for example, up to 60% of the full charge level irrespective of the electricity sales price, so that the sale of electricity electric vehicle 14 can be limited. As a result, the user 15 is able to obtain a sufficient amount of charge required for the electric vehicle 14.

The condition setting unit 14c may set at least the upper limit value of the electricity purchase price (electricity sales price for the resource aggregator 13) that is applied when electric power is charged to the electric vehicle 14 through the resource aggregator 13. Setting the upper limit value of the electricity purchase price applied when electric power is charged to the electric vehicle 14 through the resource aggregator 13 allows the user 15 to permit the electric vehicle 14 to participate as an energy resource of the resource aggregator 13, and to purchase electric power by the electric vehicle 14 when the electricity purchase price is lower than a certain level. Also, the user 15 is allowed to prohibit the electric vehicle 14 from participating as an energy resource of the resource aggregator 13 and to limit the purchase of electricity by the electric vehicle 14 when the electricity purchase price is higher than a certain level. As a result, the user 15 is able to charge the electric vehicle 14 only when the price of electric power is low.

On the other hand, the resource aggregator 13 may control the price of electricity so as to lower the electricity sales price (the electricity purchase price for the electric vehicle 14) when the request for "upward DR" for increasing demand becomes higher in the demand response. In cases where at least the upper limit value of the electricity purchase price applied when electric power is charged to the electric vehicle 14 through the resource aggregator 13 is set in the condition setting unit 14c, lowering the electricity purchase price by the resource aggregator 13 results in an increase in the number of electric vehicles 14 participating in the demand response service as the energy resources. This enables the resource aggregator 13 to attract more electric vehicles 14 to participate as the energy resources, to respond to the request for "upward DR" with charging to the electric vehicles 14, and to more easily deal with the demand response.

It is also possible that the condition setting unit 14c may set a required amount of charge at which the user 15 wishes to store in the electric vehicle 14 irrespective of the upper limit of the electricity purchase price that is set herein. For example, when the user 15 wishes to keep at least about 60% state of charge of the full charge level for the electric vehicle 14, the required amount of charge may be set to 60% of the full charge level (i.e., 60% SOC). In this case, the electric vehicle 14 is permitted to be charged, for example, up to 60% of the full charge level irrespective of whether or not the electric vehicle 14 is allowed to participate as an energy resource of the resource aggregator 13. As a result, the user 15 is able to obtain a sufficient amount of charge required for the electric vehicle 14.

A condition for the electric vehicle 14 to interchange electric power through the charging and discharging facility 12 may be, for example, an incentive distributed to the user 15 of the electric vehicle 14 according to the use of the electric vehicle 14 by the resource aggregator 13 as an energy resource, when the electric vehicle 14 is connected to the charging and discharging facility 12. In this case, it is possible that, on the resource aggregator 13 side, the condition for interchanging electric power may be set so that, for example, the higher the request for demand response is higher, the greater the incentive distributed to the user. Setting the condition in this way increases the incentive distributed to the user 15 when the request for demand response is high. Accordingly, it is expected that this increases the number of users 15 who permit the resource aggregator 13 to use their electric vehicles 14 as energy resources. In addition, the resource aggregator 13 is allowed to use more electric vehicles 14 as energy resources when the request for demand response (DR) is high. Thus, the resource aggregator 13 can more easily respond to the request for demand response (DR), reducing the burden to operate the service.

On the other hand, in the electric vehicle 14, the conditions for interchanging electric power are set appropriately by the condition setting unit 14c. This allows the user 15 to permit the electric vehicle 14 to participate in the demand response operated by the resource aggregator 13 when the electricity purchase price is raised by the resource aggregator 13 or when the electricity sales price is lowered by the resource aggregator 13. This allows the user 15 to sell and buy electric power at a price the user 15 considers appropriate, which provides benefit for the user 15. Moreover, the user 15 is able to permit the electric vehicle 14 to participate in the demand response operated by the resource aggregator 13 at a time appropriate for the demand and supply adjustment that is performed when the electric power demand response is urgent, according to the price adjustment on the resource aggregator 13 side. Through the use of this charging and discharging management system 10, the user 15 can also obtain the satisfaction of contributing to social responsibility of alleviating the urgently required electric power demand adjustment.

It is described herein that the condition for interchanging electric power is set by the user 15 using the condition setting unit 14c, but it is also possible that the condition may not be set by user 15. In this case, for example, the charging and discharging management system 10 may be configured so that the resource aggregator 13 is entrusted with control for interchanging electric power and the user 15 can obtain a compensation accordingly. The condition setting unit 14c may include a mode in which control for interchanging electric power is entrusted to the resource aggregator 13. This enables the resource aggregator 13 to make use of the electric vehicle 14 as an energy resource as appropriate according to the demand response. The condition setting unit 14c may also be configured to be able to set a date and time at which the resource aggregator 13 is permitted to perform the control for interchanging electric power. For example, the condition setting unit 14c may be configured to reserve a day and a time slot in which it is desired to interchange electric power periodically. In this case, if the electric vehicle 14 is connected to the charging and discharging facility 12 on the reserved day or in the reserved time slot, electric power is interchanged in a predetermined mode according to the control performed by the resource aggregator 13.

In addition, the electric vehicle 14 may be configured to store records of sales and purchase of electricity in interchanging electric power. Storing records of sales and purchases of electricity in interchanging electric power allows the electric vehicle 14 to be configured to present the records of sales and purchases of electricity to the user 15. From this viewpoint, the electric vehicle 14 may further include a recording unit 14d that stores records of sales and purchase of electricity when electric power is interchanged with the charging and discharging facility 12 through the resource aggregator 13. This enables the user 15 to check the interchanging of electric power when the electric vehicle 14 is used as an energy resource of the resource aggregator 13.

Figure 3:
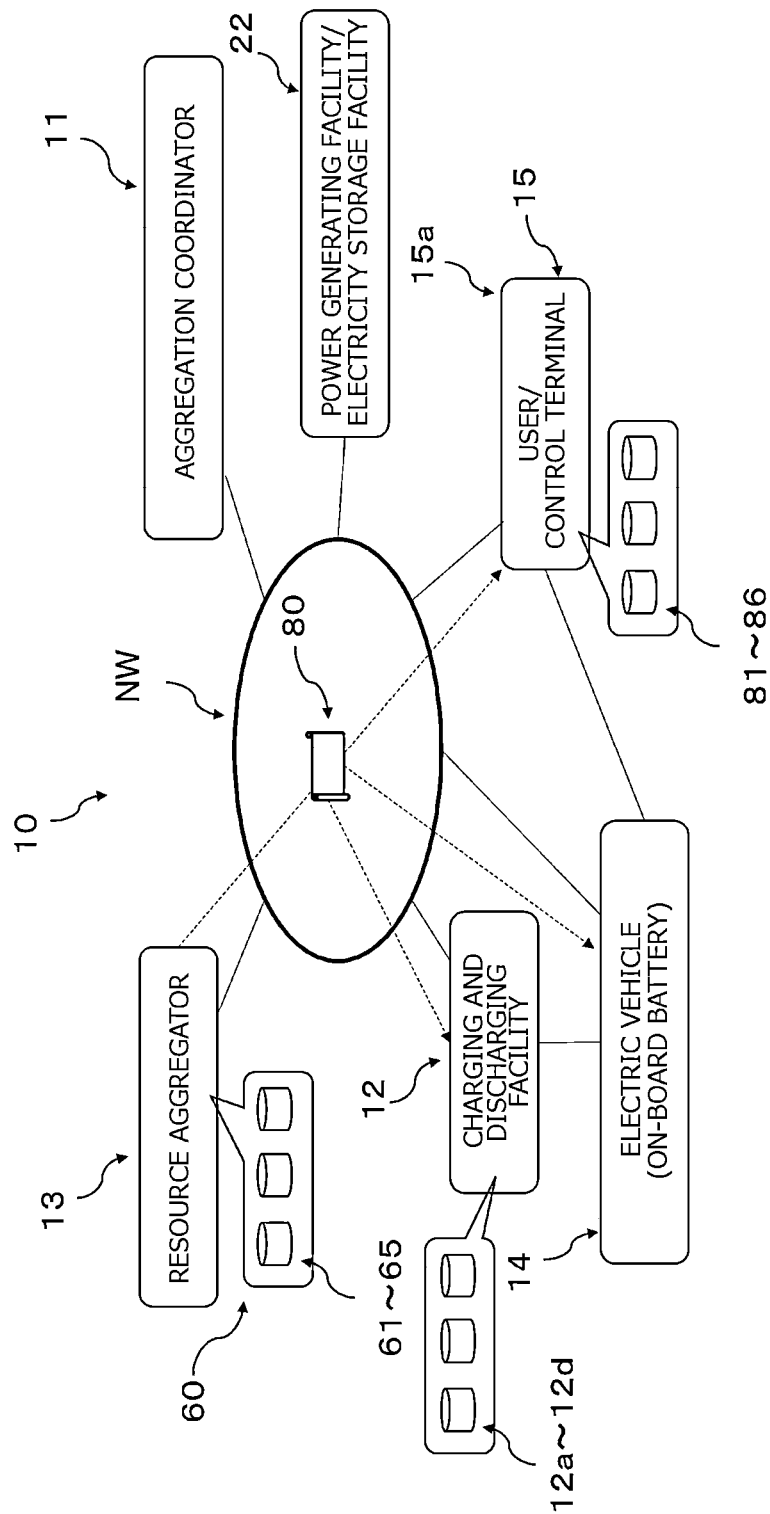
FIG. 3 is a schematic view schematically illustrating another embodiment of the charging and discharging management system 10.

FIG. 3 is a schematic view schematically illustrating another embodiment of the charging and discharging management system 10. As illustrated in FIG. 3, the charging and discharging management system 10 may be configured to cause the charging and discharging facility 12 to execute the process in which the user 15 permits the electric vehicle 14 to participate in the demand response operated by the resource aggregator 13.

For example, the charging and discharging facility 12 may include a detecting unit 12a that detects that an electric vehicle 14 is connected thereto, and a selection process unit 12b configured to select whether or not to permit the charging and discharging facility 12 to interchange electric power with the electric vehicle 14 through the resource aggregator 13 when the electric vehicle 14 is connected thereto. In this case, the user 15 is able to select whether or not to permit interchange of electric power between the charging and discharging facility 12 and the electric vehicle 14 through the resource aggregator 13 by operating the charging and discharging facility 12.

The charging and discharging facility 12 may include a condition setting unit 12c that sets conditions for interchanging electric power. The condition setting unit 12c may be configured to set at least the lower limit value of the electricity sales price that is applied when electric power is discharged from the electric vehicle 14 through the resource aggregator 13. The condition setting unit 12c may be configured to set at least the upper limit value of the electricity purchase price that is applied when electric power is charged to the electric vehicle 14 through the resource aggregator 13. The condition setting unit 12c may be configured to be able to set a required amount of charge for the electric vehicle 14. The condition setting unit 12c may include a mode in which control for interchanging electric power is entrusted to the resource aggregator 13. The condition setting unit 12c may also be configured to be able to set a date and time at which the resource aggregator 13 is permitted to perform the control for interchanging electric power. The charging and discharging facility 12 may further include a recording unit 12d that stores records of sales and purchase of electricity when electric power is interchanged with the charging and discharging facility 14 through the resource aggregator 13. This enables the user 15 to check the interchanging of electric power when the electric vehicle 14 is used as an energy resource of the resource aggregator 13.

Server 60

The charging and discharging management system 10 may include a server 60 as a computer that manages the system. The server 60 may be connected to a communication network NW. The communication network NW may be either a wired network or a wireless network, or may be a communication network such as the Internet or a communication network that uses power line communication utilizing the power grid. The server 60 is provided in, for example, a facility managed by the resource aggregator 13. The server 60 may be configured to serve the function within the country through the communication network NW, but the server 60 itself may be located outside the country.

Various processes of the charging and discharging management system 10 may be configured to be implemented by the server 60. The server 60 may be implemented by either a single computer or a cooperative process of a plurality of computers. Various processes of the charging and discharging management system 10 may be implemented by a cooperative process of the server 60 with the control terminal 15a of the user 15, the charging and discharging facility 12, the computer of the electric vehicle 14, and the like. The control terminal 15a of the user 15, the charging and discharging facility 12, the computer of the electric vehicle 14, and the like may incorporate necessary corresponding software.

In this embodiment, the server 60 includes a memory storage unit 61, a detection unit 62, a controller 63, a notification unit 64, and a condition storing unit 65.

The memory storage unit 61 is configured to associate electric vehicles and users respectively with each other and store the associated information. More specifically, the memory storage unit 61 is configured to store vehicle information identifying electric vehicles and user information identifying users in association with each other. Herein, the vehicle information is information identifying the electric vehicle 14. The user information is information identifying the user 15. The vehicle information may be assigned, for example, an ID for identifying the electric vehicle 14. For the vehicle information of the electric vehicle 14, it is possible to adopt a vehicle registration number (number on the registration plate), for example. The user information may be assigned, for example, an ID for identifying the user 15. The user information may be a terminal device information identifying the control terminal 15a operated by the user 15, or may be a user ID provided by what is called a digital platform service provider. The server 60 may associate electric vehicles and users with each other by storing vehicle information and user information in association with each other.

For example, the server 60 of the resource aggregator 13 may be configured to store the vehicle information of the electric vehicle 14 and the control terminal 15a of the user 15 in association with each other based on the information acquired from the user 15 when the user 15 uses the charging and discharging management system 10 provided by the resource aggregator 13 for the first time.

The user information may include payment information used when a payment is made for sales and purchase of electricity. For example, the user information may be configured so that the user 15 can use the compensation obtained by the sales of electricity through the resource aggregator 13 when purchasing electric power through the resource aggregator 13 (i.e., when charging the electric vehicle 14). In this case, for example, the user information may be configured to store the compensation obtained by the sales of electricity through the resource aggregator 13, which will be offset when purchasing electric power through the resource aggregator 13 (i.e., charging the electric vehicle 14). Alternatively, the user information may be configured so that the compensation obtained by the sales of electricity through the resource aggregator 13 can be exchanged with points that are commercially usable by the user. In this case, the user information may contain information that enables the user to exchange the compensation with commercially usable points. For the commercially usable points, it is possible to employ various types of points that are usable for cashless payments.

The detection unit 62 is configured to detect that the electric vehicle 14 has been connected to the charging and discharging facility 12 through the communication network NW. For example, the server 60 of the resource aggregator 13 may be configured to cooperate with the charging and discharging facility 12 by power line communication, to detect that the electric vehicle 14 has been connected to the charging and discharging facility 12. The charging and discharging facility 12 may incorporate a controller that operates according to a required program.

The controller 63 is configured to start interchange of electric power between the charging and discharging facility 12 and the electric vehicle 14 through the resource aggregator 13, based on the permission information acquired from the control terminal 15a of the user 15 through the communication network NW. In this case, the controller 63 of the server 60 starts interchange of electric power between the charging and discharging facility 12 and the electric vehicle 14 through the resource aggregator 13 when permission information acquired from the control terminal 15a of the user 15 is obtained. This prevents the electric vehicle 14 from being used as an energy resource of the resource aggregator 13 against the intention of the user 15.

Such a charging and discharging management system 10 enables the user 15 to select whether or not to permit interchange of electric power through the resource aggregator 13 when the electric vehicle 14 is connected to the charging and discharging facility 12. As a result, the user 15 is able to clearly indicate his/her intention on the interchange of electric power through the resource aggregator 13. The resource aggregator 13 is allowed to clearly confirm the indication of intention of the user 15 who connects the electric vehicle 14 to the charging and discharging facility 12 by the function of the server 60, and also to store the indication of intention of the user 15 in the server 60. The resource aggregator 13 is allowed to use the electric vehicle 14 as an energy resource based on such an intention of the user 15. Thus, it is possible to confirm the intention of the user 15 more easily, making it easier to use the electric vehicle 14 as an energy resource reliably. As a result, the resource aggregator 13 is allowed to deal with the demand response that is required from the aggregation coordinator 11 more easily.

The notification unit 64 is configured to notify that the electric vehicle 14 has been connected to the charging and discharging facility 12 to the control terminal 15a of the user 15 associated with the electric vehicle 14 connected to the charging and discharging facility 12. Furthermore, the charging and discharging management system 10 is configured to start interchange of electric power between the charging and discharging facility 12 and the electric vehicle 14 through the resource aggregator 13, based on the permission information acquired from the control terminal 15a of the user 15 after the notification from the notification unit 64.

For example, the charging and discharging management system 10 may be configured to cause the control terminal 15a of the user 15 to show a display screen allowing the user 15 to select whether or not to permit interchange of electric power through the resource aggregator 13 when the electric vehicle 14 is connected to the charging and discharging facility 12. In one specific example, when the detection unit 62 detects that the electric vehicle 14 is connected to the charging and discharging facility 12, the notification unit 64 may send detection information to the control terminal 15a of the user 15 through the communication network NW. The control terminal 15a of the user 15 may be configured to show a display screen allowing the user 15 to select whether or not to permit interchange of electric power through the resource aggregator 13 based on the detection information acquired from the notification unit 64.

Furthermore, interchange of electric power may be started between the charging and discharging facility 12 and the electric vehicle 14 through the resource aggregator 13, based on the permission information acquired from the control terminal 15a of the user 15 after the notification from the notification unit 64. For example, in this embodiment, the charging and discharging management system 10 may be configured to cause the control terminal 15a of the user 15 to show a display screen allowing the user 15 to select whether or not to permit interchange of electric power through the resource aggregator 13 when the electric vehicle 14 is connected to the charging and discharging facility 12. The charging and discharging management system 10 may be configured so that, when the user 15 selects to permit interchange of electric power through the resource aggregator 13 using the control terminal 15a, required permission information is transmitted to the server 60 of the resource aggregator 13 through the communication network NW. The server 60 starts interchange of electric power between the charging and discharging facility 12 and the electric vehicle 14 through the resource aggregator 13 based on the permission information that permits interchange of electric power through the resource aggregator 13. In this case, a control signal for controlling such interchange of electric power may be transmitted from the server 60 to the charging and discharging facility 12.

The condition storing unit 65 stores conditions for interchanging electric power between the charging and discharging facility 12 and the electric vehicle 14 through the resource aggregator 13, the conditions being associated with the electric vehicle 14 or the user 15. For the conditions for interchanging electric power, it is possible to set at least the lower limit value of the electricity sales price (electricity purchase price for the resource aggregator 13) that is applied when electric power is discharged from the electric vehicle 14 through the resource aggregator 13. For the conditions for interchanging electric power, it is also possible to set at least the upper limit value of the electricity purchase price (electricity sales price for the resource aggregator 13) that is applied when electric power is charged to the electric vehicle 14 through the resource aggregator 13. It is also possible for the conditions for interchanging electric power to set a required amount of charge at which the user 15 wishes to store in the electric vehicle 14 irrespective of the electricity sales price or the electricity purchase price. Such conditions for interchanging electric power as described above may be set for each user 15 or each electric vehicle 14. The conditions for interchanging electric power may be associated with the vehicle information identifying the electric vehicles 14 and the user information identifying the users 15 and be stored in the condition storing unit 65.

It is also possible that the user 15 may entirely entrust the resource aggregator 13 with setting the conditions for interchanging electric power and entrust the control. It is also possible to set the date and time (day and time slot) at which electric power is permitted to be interchanged with the resource aggregator 13. In this case, the resource aggregator 13 may identify the usage of the electric vehicles 14 by the users 15 and manage the information with the server 60. The usage of the electric vehicle 14 by the user 15 may be, for example, the past usage of the electric vehicle 14 by month, by day, or by hour. By acquiring these pieces of information, the resource aggregator 13 is able to judge an appropriate amount of charge required, to determine the amount of electric power to be interchanged with the electric vehicle 14.

In addition, the server 60 may be configured to record the amount and price of electricity charged and sold to the electric vehicle 14 and the amount and price of electricity purchased from the electric vehicle 14. The server 60 may also be configured to obtain the balance of the amount and price of electricity charged and sold to the electric vehicle 14 and the amount and price of electricity purchased from the electric vehicle 14 within a predetermined period. By using this, the server 60 may manage the past balance of the amount and unit price of electricity charged and the amount and unit price of electricity purchased. The server 60 may be configured to present the income and expenditure within a designated period in response to the request from the user 15.

The server 60 may be configured to store the compensation obtained by the sales of electricity from the electric vehicle 14 or the user 15. In this case, the server 60 may store such a compensation in association with the electric vehicle 14 or the user 15. The compensation obtained by the sales of electricity from the electric vehicle 14 or the user 15 may be configured to be able to be used for the purchase of electricity by the electric vehicle 14 or the user 15. This makes it possible to pay the compensation obtained by the sale of electricity from the electric vehicle 14 or the user 15 at the time of the purchase of electricity, not by cash or a bank transfer. As a result, the profit can be distributed to the user 15 without making an exchange of monetary compensation. Also in this case, the distribution of profit is made within the bounds of the service provided by the resource aggregator 13. Normally, the electric vehicle 14 consumes electric power through driving. For this reason, from a long-term viewpoint, it is expected that the compensation obtained by the sale of electricity from the electric vehicle 14 or the user 15 does not exceed the compensation obtained by the purchase of electricity. This means that, in the management of the compensation obtained by the sale of electricity from the electric vehicle 14 or the user 15, the resource aggregator 13 is able to offset the compensation against the purchase of electricity made by the electric vehicle 14 or the user 15, so that the process of paying money from the resource aggregator 13 to the user 15 is unnecessary. This enables easy management for the resource aggregator 13.

The server 60 may be configured so that the compensation obtained by the sales of electricity from the electric vehicle 14 or the user 15 is exchanged with points that can be commercially used by the user 15. The commercially usable points include digital currency, affiliated points that are usable at various kinds of stores, and the like. The compensation obtained by the sales of electricity from the electric vehicle 14 or the user 15 may be configured to be exchangeable with commercially usable points. In this case as well, the process of paying money from the resource aggregator 13 to the user 15 is unnecessary. This enables easy management for the resource aggregator 13. Moreover, the user 15 is able to use the compensation a greater variety of ways and therefore gain benefits more easily.

Program

Herein, a program 80 is the software that is embedded in the control terminal 15a of the user 15 so that the control terminal 15a of the user 15 can serve required functions. In order to accomplish the charging and discharging management system 10 as described above, appropriate software may be embedded in the control terminal 15a of the user 15. The control terminal 15a of the user 15 includes a computer incorporated in the electric vehicle 14. For example, the control terminal 15a may be one that allows the user 15 to perform required operations through a control screen panel of the electric vehicle 14. The control terminal 15a of the user 15 includes a computer incorporated in the charging and discharging facility 12. For example, the control terminal 15a may be one that allows the user 15 to perform required operations through a control screen panel provided for the charging and discharging facility 12. The above-described program 80 may be configured to be distributed through the communication network NW so as to be installed in the control terminal 15a of the user 15. The program 80 may be distributed from the server 60 or may be provided through a website that is dedicated to providing software to the control terminal 15a of the user 15. The program 80 may be configured to be updated as appropriate to the latest software. The program 80 may be embedded in a mobile terminal of the user 15, a computer incorporated in the electric vehicle 14, a computer incorporated in the charging and discharging facility 12, or the like, each of which can serve as the control terminal 15a of the user 15 as described above. The program 80 may be programmed according to the control terminal 15a of the user 15. The program 80 may be stored in, for example, a non-transitory computer readable medium. Examples of the non-transitory computer readable medium include magnetic recording media (such as flexible disks, magnetic tapes, and hard disk drives) and CD-ROMs.

Herein, the program 80 may be configured to cause the control terminal 15a of the user 15 to serve the functions of selecting whether or not to permit interchange of electric power between the electric vehicle 14 and the charging and discharging facility 12 through the resource aggregator 13 when the electric vehicle 14 is connected to the charging and discharging facility 12 and transmitting the result of the selection to a predetermined server 60. The program 80 may cause the control terminal 15a of the user 15 to function to show a display screen for selecting whether or not to permit interchange of electric power between the electric vehicle 14 and the charging and discharging facility 12 through the resource aggregator 13 when the electric vehicle 14 is connected to the charging and discharging facility 12. For example, the program 80 may cause the control terminal 15a of the user 15 to be equipped with a selecting unit 81 as a processing module that serves such a function. The selecting unit 81 may be configured to be able to select whether or not to permit interchange of electric power between the electric vehicle 14 and the charging and discharging facility 12 through the resource aggregator 13 when the electric vehicle 14 is connected to the charging and discharging facility 12. In addition, the program 80 may implement a communication unit 82 that mutually communicates required information with the server 60. The communication unit 82 may be configured to transmit the result of selection by the user 15 to the server 60.

Herein, the control terminal 15a of the user 15 may be a mobile communication terminal of the user 15 that is communicable with the electric vehicle 14, such as a smartphone. When this is the case, the information indicating that the electric vehicle 14 has been connected to the charging and discharging facility 12 may be acquired from the electric vehicle 14. For example, in the case where a charging station as the charging and discharging facility 12 is provided in a parking space and the connection between the electric vehicle 14 and the charging and discharging facility 12 is completed when a connector plug of the charging station is connected to the electric vehicle 14, the user 15 is already off the electric vehicle 14. In such a case, it is believed convenient for the user 15 that the mobile communication terminal of the user 15 shows a display screen allowing the user 15 to select whether or not to permit interchange of electric power through the resource aggregator 13. Thus, the control terminal 15a of the user 15 may be a mobile communication terminal of the user 15. It is also possible that the control terminal 15a of the user 15 may be provided in the charging and discharging facility 12. For example, it is also possible that the display screen allowing the user 15 to select whether or not to permit interchange of electric power through the resource aggregator 13 may be configured to be shown on a control screen panel of the charging and discharging facility 12. This enables the user 15 to operate the control screen panel of the charging and discharging facility 12 after the user 15 has got off the vehicle, which is believed to be convenient for the user 15.

Alternatively, it is also possible that a control screen panel of the electric vehicle 14 may be configured to show a display screen allowing the user 15 to select whether or not to permit interchange of electric power through the resource aggregator 13. For example, the charging and discharging facility 12 may be a non-contact charging facility buried in a parking space. In this case, the user 15 may move the electric vehicle 14 to a space above the non-contact charging facility, and the electric vehicle 14 is connected to the charging and discharging facility 12 while the user 15 stays on board the electric vehicle 14. It is convenient for the user 15 when the control screen panel of the electric vehicle 14 shows a display screen allowing the user 15 to select whether or not to permit interchange of electric power through the resource aggregator 13. The program 80 may be configured to prompt the user 15 to perform a selection operation before the user 15 gets off the vehicle. Thus, the control terminal 15a of the user 15 may be provided in the electric vehicle 14. In this case, the program 80 may be configured to cause the control screen panel of the electric vehicle 14 to show a display screen allowing the user 15 to select whether or not to permit interchange of electric power through the resource aggregator 13 when the electric vehicle 14 is connected to the charging and discharging facility 12.

Thus, the program 80 may be configured to allow the user 15 to select whether or not to permit interchange of electric power through the resource aggregator 13, with the use of the control terminal 15a of the user 15, such as a mobile communication terminal of the user 15 and a control terminal provided in the electric vehicle 14 or the charging and discharging facility 12. The program 80 may be embedded in the mobile communication terminal of the user 15, or may be embedded in a computer of the electric vehicle 14 or the charging and discharging facility 12. The program 80 may cause the mobile communication terminal of the user 15, or the control terminal of the electric vehicle 14 or the charging and discharging facility 12, to serve required functions.

The program 80 may further cause the control terminal 15a of the user 15 to function to set conditions for permitting interchange of electric power between the electric vehicle 14 and the charging and discharging facility 12 through the resource aggregator 13. For example, the program 80 may cause the control terminal 15a of the user 15 to be equipped with a condition setting unit 83 as a processing module that serves such a function. In this case, the condition setting unit 83 may also be configured to be able to arbitrarily set conditions for permitting interchange of electric power through the resource aggregator 13. The program 80 may further cause, for example, the control terminal 15a of the user 15 to function to show a display screen for setting conditions for permitting interchange of electric power between the electric vehicle 14 and the charging and discharging facility 12 through the resource aggregator 13. For the conditions for permitting interchange of electric power through the resource aggregator 13, it is also possible to prepare several patterns in advance. The control terminal 15a of the user 15 may be configured to be able to select a condition for permitting interchange of electric power through the resource aggregator 13 from the prepared patterns of conditions.

The program 80 may further cause the control terminal 15a of the user 15 to function to store conditions for permitting interchange of electric power between the electric vehicle 14 and the charging and discharging facility 12 through the resource aggregator 13. For example, the program 80 may cause the control terminal 15a of the user 15 to be equipped with a condition storing unit 84 as a processing module that serves such a function. In this case, the control terminal 15a of the user 15 stores the conditions for permitting interchange of electric power through the resource aggregator 13, making it unnecessary to set the conditions every time. In addition, it is easy for the user 15 to reuse or reset the conditions. Therefore, this is convenient when repeatedly using the services provided by the charging and discharging management system 10, such as when permitting interchange of electric power through the resource aggregator 13. Moreover, the user 15 is able to check the conditions for permitting interchange of electric power through the resource aggregator 13 with the use of the control terminal 15a even in an environment that is not connected to the server 60.

The program 80 may be configured to cause the control terminal 15a of the user 15 to store the compensation obtained by the sales of electricity from the electric vehicle 14 or the user 15. For example, the program 80 may cause the control terminal 15a of the user 15 to be equipped with a compensation storing unit 85 as a processing module that serves such a function. This makes it possible to check the compensation obtained by the sale of electricity from the electric vehicle 14 or the user 15 with the control terminal 15a of the user 15 at an appropriate time. As a result, the user 15 can easily confirm the benefit of interchanging electric power through the resource aggregator 13. Accordingly, it is more likely to produce a motivation to permit interchange of electric power through the resource aggregator 13. The program 80 may be configured so that the compensation obtained by the sales of electricity from the electric vehicle 14 or the user 15 is obtained by communication with the server 60 of the resource aggregator 13.

The program 80 may be configured to cause the control terminal 15a of the user 15 to function so as to use the compensation obtained by the sale of electricity from the electric vehicle 14 or the user 15 for the purchase of electricity by the electric vehicle 14 or the user 15. For example, the program 80 may be configured to allow the user 15 to select to use the compensation obtained by the sale of electricity from the electric vehicle 14 or the user 15 for the purchase of electricity by the user 15, as a condition for permitting interchange of electric power through the resource aggregator 13. For example, when the compensation obtained by the sales of electricity from the electric vehicle 14 or the user 15 is offset by the purchase of electricity by the user 15, that information may be processed by the server 60 of the resource aggregator 13. Even in such cases where the compensation obtained by the sales of electricity from the electric vehicle 14 or the user 15 is offset by the purchase of electricity by the user 15, the program 80 may be configured to allow the user 15 to check the information on the offset.

The program 80 may be configured so that the compensation obtained by the sales of electricity from the electric vehicle 14 or the user 15 is exchanged with points that can be commercially used by the user 15. For example, when the compensation obtained by the sales of electricity from the electric vehicle 14 or the user 15 is exchanged with points that can be commercially used by the user 15, that information may be processed by the server 60 of the resource aggregator 13. The program 80 may be configured so that when the compensation obtained by the sales of electricity from the electric vehicle 14 or the user 15 is exchanged with commercially usable points, the information indicating that exchange or the like can be checked with the use of the control terminal 15a of the user 15. This allows the user 15 to perceive the benefit of the sales of electricity easily, and to have a motivation to permit interchange of electric power through the resource aggregator 13 easily.

In the case where the compensation is used for a purchase of electricity or exchanged with points that can be commercially used by the user 15 as described above, that information may be stored in the control terminal 15a of the user 15. For example, the program 80 may cause the control terminal 15a of the user 15 to be equipped with a compensation processing unit 86 as a processing module that serves such a function.

In addition, the program 80 may cause the control terminal 15a of the user 15 to function so as to display the records of the amount and price of electricity charged and sold to the electric vehicle and the amount and price of electricity purchased from the electric vehicle. Also, the program 80 may cause the control terminal 15a of the user 15 to function so as to display the income and expenditure of the amount and price of electricity charged and sold to the electric vehicle and the amount and price of electricity purchased from the electric vehicle within a predetermined period. When this is the case, the predetermined period for displaying the income and expenditure may be specified by the user 15. The program 80 may be configured to cause the control terminal 15a of the user 15 in cooperation with the server 60 to display the records and balance of the amount and price of electricity charged and sold to the electric vehicle and the amount and price of electricity purchased from the electric vehicle. This allows the user 15 to easily check the records and balance of the amount and price of electricity charged and sold to the electric vehicle and the amount and price of electricity purchased from the electric vehicle. Moreover, according to these data, the user 15 may receive a proposal from the resource aggregator 13 about advice for future improvement of the balance. The server 60 may include an AI processing unit capable of providing the user 15 with advice for future improvement of the balance based on the big data of the records and balance of the amount and price of electricity charged and sold to the electric vehicle and the amount and price of electricity purchased from the electric vehicle.

The resource aggregator 13 may be configured to cause the server 60 to acquire the battery capacity and deterioration condition of the electric vehicle 14. When a plurality of electric vehicles 14 are available for use as the energy resources, the server 60 may be configured to select and use a more appropriate electric vehicle 14. This enables a more stable service operation.

Various embodiments of the invention have been described hereinabove according to the present disclosure. Unless specifically stated otherwise, the embodiments described herein do not limit the scope of the present disclosure. It should be noted that various other modifications and alterations may be possible in the embodiments of the present disclosure. In addition, the features, structures, or steps described herein may be omitted as appropriate, or may be combined in any suitable combinations, unless specifically stated otherwise.

The invention claimed is:

1. An electric vehicle comprising:
  a detector configured to detect whether the electric vehicle is connected to a charging and discharging facility;
  a computer configured to select whether to permit the electric vehicle, in response to being connected to the charging and discharging facility, to interchange electric power with the charging and discharging facility based on commands from a resource aggregator, wherein the computer is mounted in the electric vehicle; and
  a battery configured to interchange the electric power with the charging and discharging facility in response to a determination to permit interchanging of the electric power with the charging and discharging facility by the computer,
  wherein the computer is configured to receive conditions for interchanging electric power, the conditions comprise a minimum state of charge of the battery, and the computer is configured to not permit discharging of the battery in response to the condition of the minimum state of charge of the battery failing to be satisfied,
  wherein the conditions include both the minimum state of charge of the battery and a sale price of electricity to the resource aggregator,
  wherein the computer is configured to set at least a lower limit value of an electricity sales price applied when electric power is discharged from the electric vehicle through management server managed by the resource aggregator.

2. The electric vehicle according to claim 1, wherein the computer is configured to set a required amount of charge.

3. The electric vehicle according to claim 1, wherein the computer includes a mode in which control for interchanging electric power is entrusted to the management server managed by the resource aggregator.

4. The electric vehicle according to claim 1, wherein the computer is configured to be able to set a date and time at which the management server managed by the resource aggregator is permitted to perform control for interchanging electric power.

5. The electric vehicle according to claim 1, further comprising a memory that stores records of sales and purchase of electricity when electric power is interchanged with the charging and discharging facility through the management server managed by the resource aggregator.

6. The electric vehicle according to claim 1, further comprising a display screen, wherein the computer is configured to cause the display screen to automatically show a request to permit interchange of the electric power in response to the electric vehicle being connected to the charging and discharging facility.

7. An electric vehicle comprising:
   a detector configured to detect whether the electric vehicle is connected to a charging and discharging facility;
   a computer configured to select whether to permit the electric vehicle, in response to being connected to the charging and discharging facility, to interchange electric power with the charging and discharging facility based on commands from a resource aggregator, wherein the computer is mounted in the electric vehicle; and
   a battery configured to interchange the electric power with the charging and discharging facility in response to a determination to permit interchanging of the electric power with the charging and discharging facility by the computer,
   wherein the computer is configured to receive conditions for interchanging electric power, the conditions comprise a minimum state of charge of the battery, and the computer is configured to not permit discharging of the battery in response to the condition of the minimum state of charge of the battery failing to be satisfied,
   wherein the conditions include both the minimum state of charge of the battery and a sale price of electricity to the resource aggregator,
   wherein the computer is configured to set at least an upper limit value of an electricity purchase price applied when electric power is charged to the electric vehicle through management server managed by the resource aggregator.

* * * * *